US005688046A

United States Patent [19]

Triassi et al.

[11] Patent Number: 5,688,046

[45] Date of Patent: Nov. 18, 1997

[54] METHOD AND APPARATUS FOR MIXING A CONTAINER OF CONCENTRATE WITH DILUENT FROM SUPPLY SYSTEMS

[75] Inventors: Richard Paul Triassi, Walworth; Roger Ellsworth, Rochester; Dennis Earl Sneddon, Hilton, all of N.Y.

[73] Assignee: Eastman Kodak Company, Rochester, N.Y.

[21] Appl. No.: 557,255

[22] Filed: Nov. 14, 1995

[51] Int. Cl.[6] .................... G05D 11/02; B01F 15/02

[52] U.S. Cl. .................... 366/152.2; 366/173.1; 366/182.1

[58] Field of Search .................... 366/152.2, 138, 366/151.1, 152.1, 153.1, 162.1, 167.1, 173.1, 173.2, 181.1, 181.8, 182.1, 189

[56] References Cited

U.S. PATENT DOCUMENTS

| | | | |
|---|---|---|---|
| 3,753,554 | 8/1973 | Muller et al. | 366/138 X |
| 3,840,136 | 10/1974 | Lanfranconi et al. . | |
| 4,022,258 | 5/1977 | Steidly . | |
| 4,045,004 | 8/1977 | Berger | 366/173.1 X |
| 4,081,006 | 3/1978 | Crowell et al. . | |
| 4,103,358 | 7/1978 | Gacki et al. . | |
| 4,168,018 | 9/1979 | Zahaykevich | 366/138 X |
| 4,214,676 | 7/1980 | Cassia . | |
| 4,312,595 | 1/1982 | Houseman et al. . | |
| 4,699,188 | 10/1987 | Baker et al. . | |
| 4,941,131 | 7/1990 | Daly et al. . | |
| 5,151,731 | 9/1992 | Yamada et al. . | |
| 5,156,813 | 10/1992 | Calhoun . | |
| 5,184,164 | 2/1993 | Kose et al. . | |
| 5,331,364 | 7/1994 | Borden . | |

*Primary Examiner*—Charles E. Cooley
*Attorney, Agent, or Firm*—Peyton C. Watkins

[57] ABSTRACT

A method and apparatus for mixing a containerized concentrate with diluent from a supply system. In the method, a container of concentrate is placed within a container station. The container is opened. A flowable portion of the concentrate from the container is drained into a mixing volume. A first portion of diluent is introduced into the mixing volume. A residual portion of the concentrate is washed from the container with a second portion of the diluent to produce a volume of wash diluent. The wash diluent is added to the mixing volume. The first and second portions of diluent have a total volume proportional to the total volume of concentrate. The draining is at least substantially completed prior to the washing. The apparatus has a mixing tank and a container that retains the container and delivers the concentrate, through a concentrate outlet, to a mixing tank. An opener is disposed to open the container within the container station. A diluent source receives diluent from the diluent supply system and delivering an aloquot of diluent to the mixing tank. The diluent source is directly coupled to the supply system. The diluent source is separated from the mixing tank by an air gap. A washer receives diluent from the diluent source. The washer delivers diluent to the container station through the concentrate outlet to rinse the container. A controller actuates the washer at least substantially after the delivering of the concentrate to the mixing tank.

12 Claims, 8 Drawing Sheets

METHOD AND APPARATUS FOR MIXING A CONTAINER OF CONCENTRATE WITH DILUENT FROM SUPPLY SYSTEMS

FIELD OF THE INVENTION

The invention relates to mixing equipment and more particularly relates to a method and apparatus for mixing a container of concentrate with diluent from a supply system.

BACKGROUND OF THE INVENTION

In a variety of fields, chemical solutions and mixtures and the like are shipped as concentrates, but are later used after diluting. A problem is presented if the diluted solution or mixture is not stable on a long term basis and, at the same time, is subject to variable usage demands. The diluted solution or mixture needs to be made up quickly and easily in small batches. This presents a further shortcoming. Small batches magnify the problem of disposing of empty concentrate containers, particularly if residual concentrate is retained in the containers. The containers can be collected and the residual concentrate manually rinsed out, but this creates waste water and a further disposal problem. Another problem is presented in the dilution of concentrate if regulations require an anti-siphoning provision in equipment connected to a civic water supply or the like.

U.S. Pat. No. 4,103,358 to Gacki et al teaches a fluid mixing and dispensing system that washes the outsides of containers. U.S. Pat. No. 4,941,131 to Daly et al teaches a container flush for a fluid mixing system like that in U.S. Pat. No. 4,103,358. The flush and other water delivery components are coupled to a supply of pressurized water. U.S. Pat. No. 4,312,595 to Houseman et al teaches another fluid mixing system in which a container flush and other water delivery components are coupled to a supply of pressurized water.

U.S. Pat. No. 5,156,813 teaches a cup for use with a pipette probe in which fluid is introduced into a cup having an overflow element.

It would thus be desirable to provide a method and apparatus for mixing a container of concentrate with diluent from a supply system in which container rinsing is delayed until concentrate is substantially drained from one or more containers.

SUMMARY OF THE INVENTION

The invention is defined by the claims. The invention, in its broader aspects, provides a method and apparatus for mixing a containerized concentrate with diluent from a supply system. In the method, a container of concentrate is placed within a container station. The container is opened. A flowable portion of the concentrate from the container is drained into a mixing volume. A first portion of diluent is introduced into the mixing volume. A residual portion of the concentrate is washed from the container with a second portion of the diluent to produce a volume of wash diluent. The wash diluent is added to the mixing volume. The first and second portions of diluent have a total volume proportional to the total volume of concentrate. The draining is at least substantially completed prior to the washing. The apparatus has a mixing tank and a container that retains the container and delivers the concentrate, through a concentrate outlet, to a mixing tank. An opener is disposed to open the container within the container station. A diluent source receives diluent from the diluent supply system and delivering an aloquot of diluent to the mixing tank. The diluent source is directly coupled to the supply system. The diluent source is separated from the mixing tank by an air gap. A washer receives diluent from the diluent source. The washer delivers diluent to the container station through the concentrate outlet to rinse the container. A controller actuates the washer at least substantially after the delivering of the concentrate to the mixing tank.

It is an advantageous effect of at least some of the embodiments of the invention that there is provided a method and apparatus for mixing a container of concentrate with diluent from a supply system in which container rinsing is delayed until concentrate is substantially drained from one or more containers.

BRIEF DESCRIPTION OF THE FIGURES

The above-mentioned and other features and objects of this invention and the manner of attaining them will become more apparent and the invention itself will be better understood by reference to the following description of an embodiment of the invention taken in conjunction with the accompanying figures wherein.

DESCRIPTION OF PARTICULAR EMBODIMENTS

The term "concentrate" is used herein in a broad sense to refer to a liquid or solid material that is mixed with a second material, the diluent, prior to use. The second material is a liquid and in most uses is water. The concentrate can be dissolved or dispersed in the "diluent". The product of the mixing of concentrate and diluent is referred to herein as the "diluted mixture".

Figure 1A:
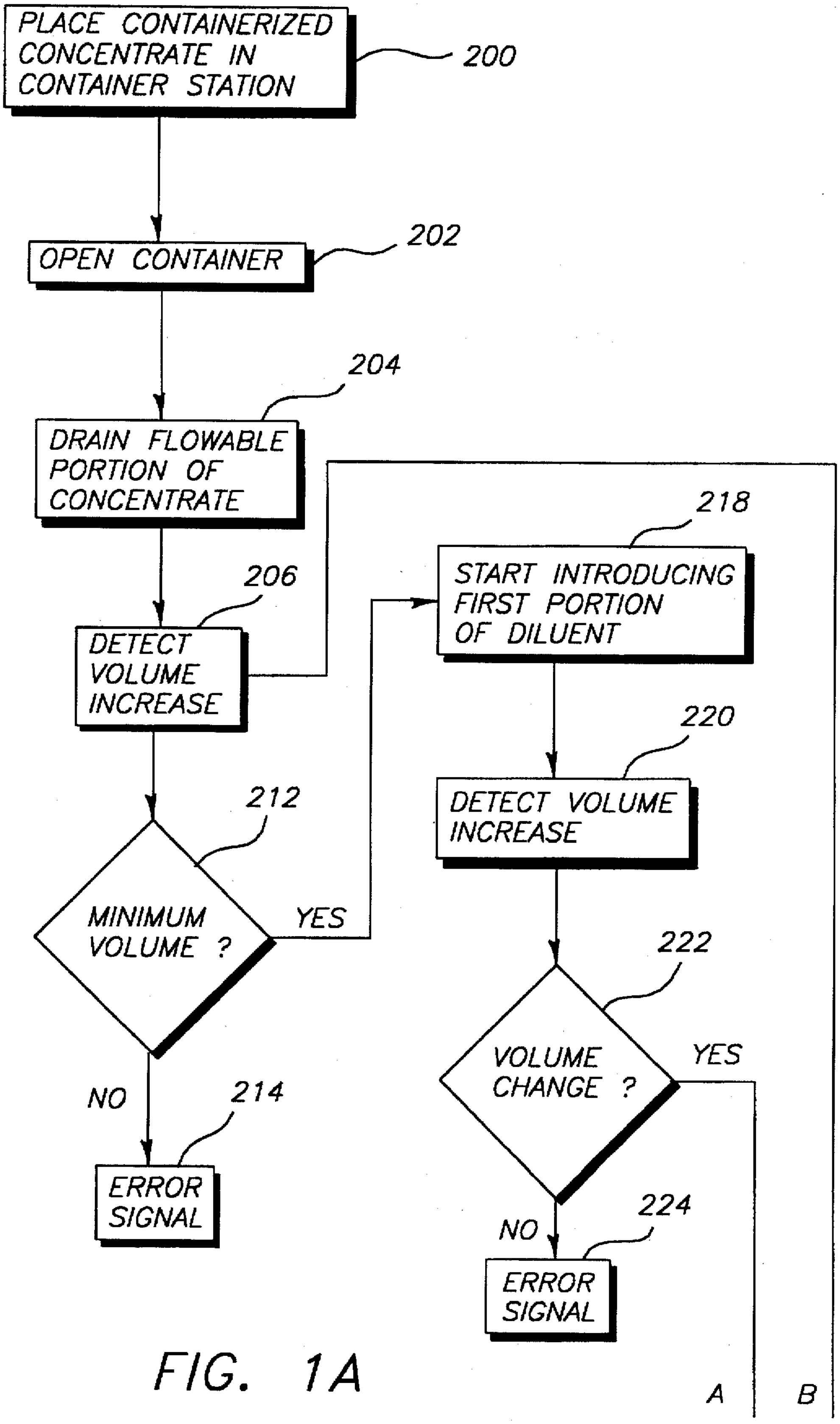
FIGS. 1A–1B are a schematic diagram of an embodiment of the method of the invention.
Figure 1B:
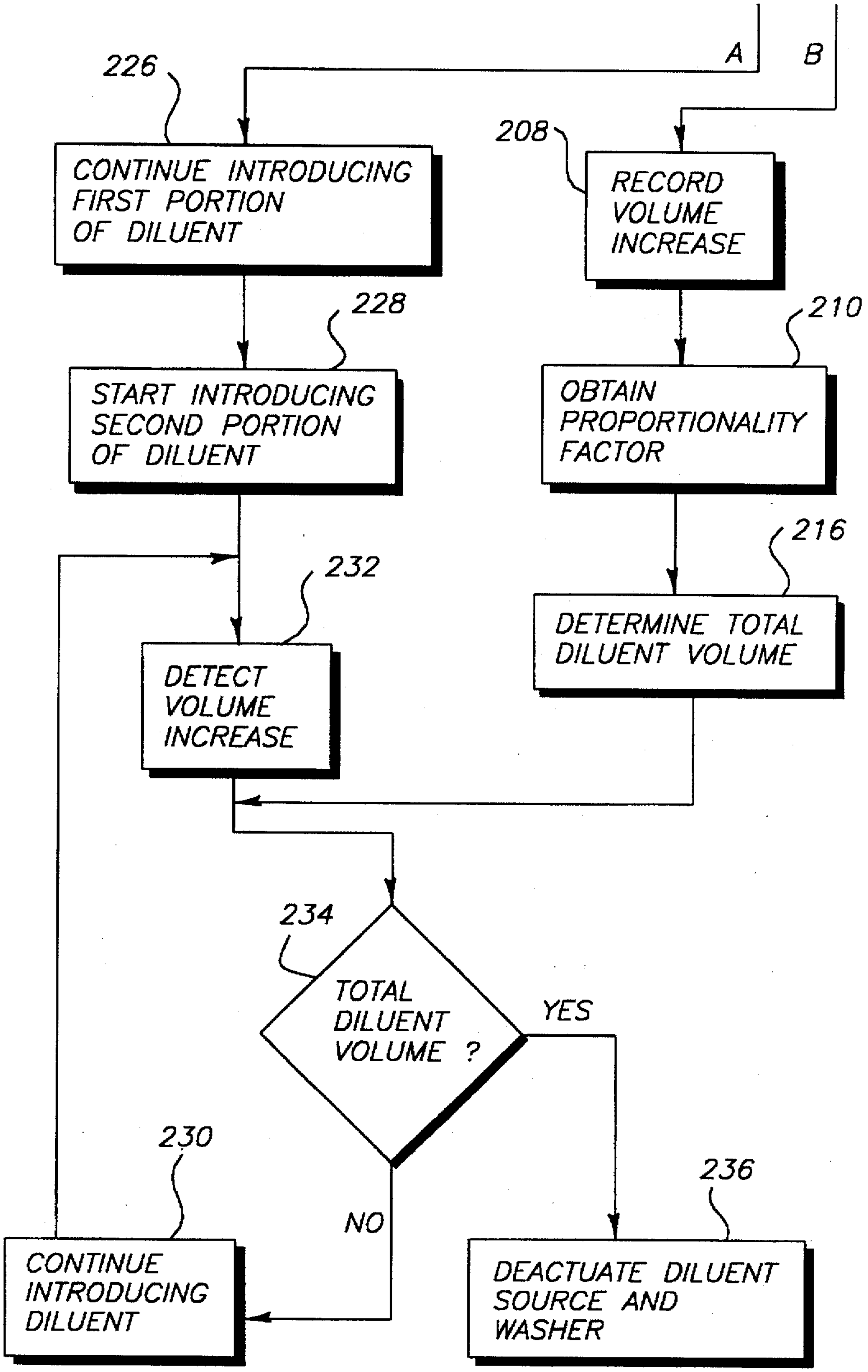
Figure 2:
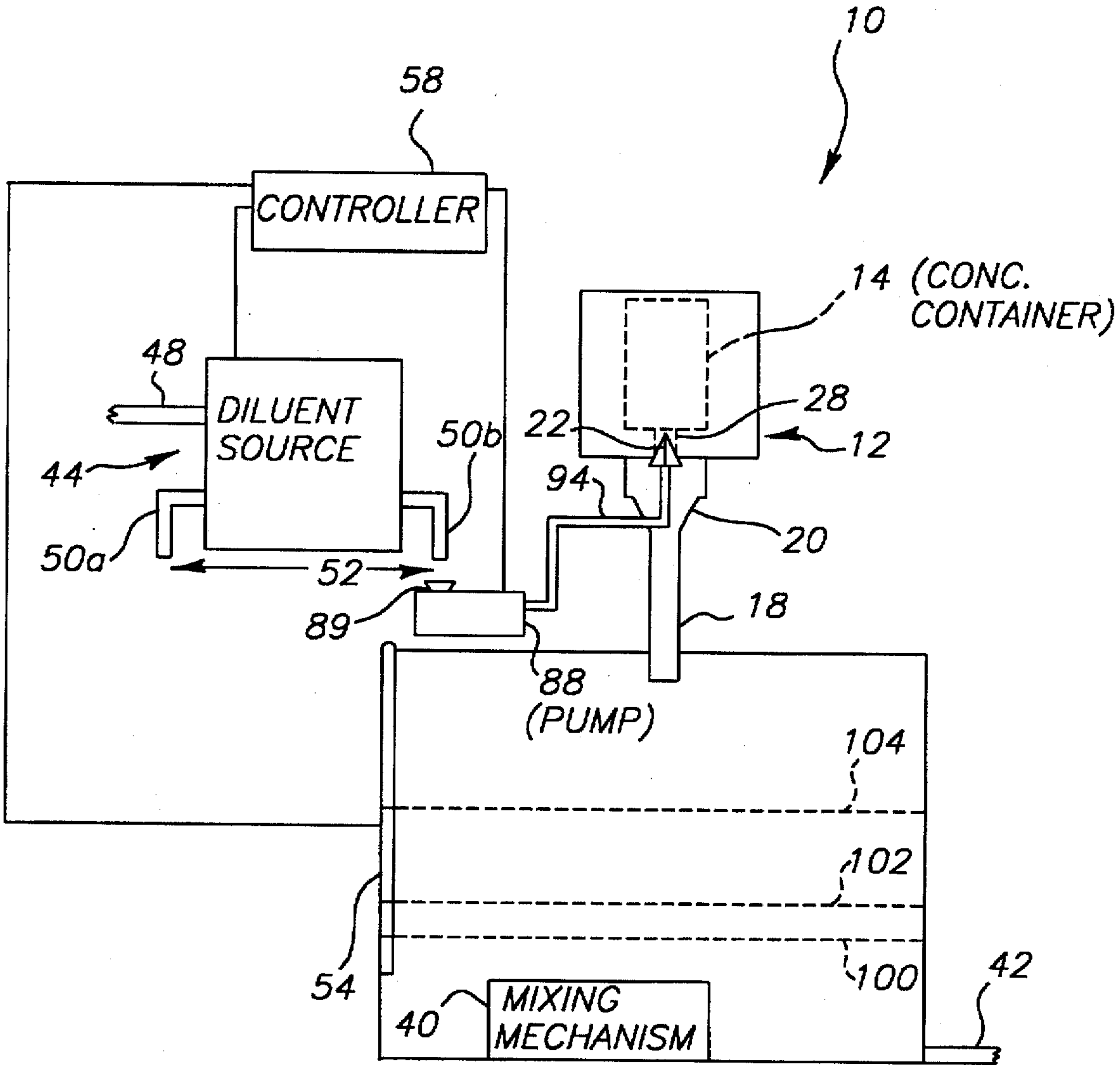
FIG. 2 is a semi-diagrammatical view of an embodiment of the apparatus of the invention.

Referring now to FIGS. 1A–1B and 2, in an embodiment of the method and apparatus 10 of the invention, a concentrate container 14 (the location of the container is indicated in FIG. 2 by dashed lines) is placed (200) in a container station 12. The station 12 is actuable to deliver a volume of concentrate, i.e., the batch within the container 14, into and through the funnel 20 and then outward through the concentrate outlet 18. The station 12 can be actuated by opening a container 14, pouring the contents into the station 12, and placing the container 14 on the container receiver 16. It is highly preferred, however, that the station 12 include a container opener 22 and that actuation of the station 12 comprise a single procedure in which the container 14 is opened and drained within the station 12. This minimizes the chance of spillage, since the operator does not pour the concentrate from the container 14. The nature of the actuation of the station 12 depends upon the nature of the container 14. In order to be used with the apparatus 10, the container 14 must be capable of retaining the concentrate until needed, be capable of being opened and drained within the station 12, and must be internally accessible after the concentrate has been drained. It is currently preferred that the container 14 be opened and drained by puncturing. Preferred containers 14; after puncturing, draining, and washing within the apparatus 10 of the invention, and without further operator action; can be recycled as single material polymer objects. A specific example of a container 14 suitable for use with the apparatus 10 of the invention is a bottle made of high density polyethylene that has a puncturable high density polyethylene cap.

The placement (200) of the container 14 in the station 12 and the opening (202) of the container by means of an opener 22 can occur simultaneously, that is, placing the containerized concentrate in the container station can cause the container to encounter and be pierced by a fixed opener. Alternatively, the container can first be placed in the container station and then subsequently can be opened while in the container station by a movable opener. It is preferred that the container be placed in the container station and opened and then be retained continuously within the container station until the method of the invention is completed.

A flowable portion of the concentrate is then drained (204) out of the container 14, through a funnel 20, and into a mixing volume or mixing tank 32 where a mixing mechanism 40, such as a stirrer, provides mixing. The term "flowable" is used herein to refer to that portion of a liquid, within an open container, that can be removed by upending the container and waiting until flow stops. With relatively dilute aqueous solutions, the rate limiting factor for drainage of the flowable portion of a liquid, is generally the the configuration of the container opening. The term "residual" is used herein to refer to that portion of the liquid that does not drain, but rather remains in the container as a thin, and generally discontinuous, layer or pattern on the interior wall of the container.

The original volume of diluted mixture in the mixing tank, indicated by dashed line 100, is increased to a new level, indicated by dashed line 102 and sensor 54 detects (206) the volume increase or new volume due to the delivery of the flowable portion of concentrate to the mixing volume 32 and sends a signal to a controller 58. Concentrate volume information provided by the signal, or a calculated total diluent volume based upon the concentrate volume information, is recorded (208) by the controller 58.

A convenient controller 58 utilizes a microprocessor and stores the volume information in a memory element associated with the microprocessor. The sensor 54 provides a signal compatible with the microprocessor. Suitable sensors are discussed in greater detail below. The functions provided by the controller are not complex. Thus, the controller can be "hard-wired" using discrete electronic components. Memory storage can be provided by an array of flip-flops (bistable multivibrators) or switches or the like.

The controller 58 determines (216) a value of total diluent volume based upon the concentrate volume information and a proportionality factor or proportional value. The proportionality factor, the relative ratio of concentrate and diluent, is a function of the chemistry of the materials used and for many embodiments of the invention, is predetermined by the manufacturer of the concentrates, prior to use of the apparatus for a particular diluted mixture. The mixer can include provision to accommodate concentrate containers of different standard sizes, if desired. Necessary sensors and controls for varying the diluent added with a parameter of the concentrate added, for example, concentrate weight, can be incorporated in the mixer. Provision can similarly be made to modify the diluted mixture in response to variations in a particular parameter; for example, specific gravity, if desired for a particular purpose.

The value of the proportionality factor can thus be determined (210) as needed from current parameters of the diluted mixture or can be preset by programming the controller or otherwise setting an operating parameter of the apparatus. It is currently preferred that the proportionality factor is predetermined and is the dilution ratio necessary to produce a solution of a particular concentration from a concentrate having a standarized concentration and total volume. The controller 58 can be limited to a single predetermined proportionality factor or a series of such factors. If limited to a single factor, the controller can be very simple and can be limited to an on-off or error-no error function. This approach reduces complexity, but inhibits the use of multiple sizes of containers and precludes fine manipulation of the proportionality factor to meet individual requirements. It is preferred that the proportionality factor be provided by software or hardware incorporating a look-up table or calulation that can be manipulated to meet changes in container sizes, or individual variability or the like. Provision can also be made to preclude withdrawls of the diluted mixture (a mixing tank outlet is indicated by element 42), prior to addition of required amounts of both concentrate and diluent.

In a particular embodiment of the invention, when the concentrate is added to the mixing volume 54, the concentrate volume information is also compared (212) to a predetermined minimum value. If the concentrate volume information exceeds the predetermined minimum value, then introduction of the first portion of diluent is started (218). If the concentrate volume information does not exceed the predetermined minimum value, the controller does not respond and waits for more concentrate to be added. An error signal (214) can be generated, if the predetermined minimum value is not exceeded within a particular time. The error signal can be used to halt the operation and notify the operator of the error condition. The predetermined minimum value can represent the minimal flowable volume of the smallest size container usable in the apparatus. Alternatively, the predetermined minimum value could be set to the size of the container in the container station, either manually, or automatically by means of a sensor in the container station.

After the addition of the flowable portion of concentrate is completed or is substantially completed, introduction is started of a first portion of diluent. The diluent is provided by a diluent supply system (indicated by coupling 48), to a diluent source 44 having an allocation unit 46 that provides the aloquot of diluent of appropriate volume. The diluent is provided through a diluent outlet 50 of the diluent source 44, and into the mixing tank 54. In a particular embodiment of the invention, the sensor 54 detects (220) the volume change in the mixing tank and sends a signal corresponding to an initial diluent volume increase and the controller 58 compares (222) this increase to a minimal initial diluent value, ordinarily zero. If there is no volume change relative to the minimal initial diluent value, an error signal (224) is generated, which can be used to halt the operation and notify the operator of the error condition. If a greater volume is detected, then introduction of the first portion of diluent is continued (226).

A second portion of diluent is initially introduced (228) from the diluent outlet 50 of the diluent source 44, after, or substantially after, the addition of the flowable concentrate.

During or after the introduction of the second portion of diluent, the washer 88 is actuated by the controller 58, resulting in the washing (not separately indicated in FIGS. 1A–1B) of the container. The draining (204) of the flowable portion of the concentrate is completed or substantially completed prior to the washing of the container with the second portion of diluent. The second portion of diluent can be introduced contemporaneous with, prior to, or after the introduction of the first portion of diluent into the mixing tank. The first and second portions of diluent have a total volume that is proportional to the total volume of the concentrate.

The second portion of diluent is used to wash the residual portion of the concentrate from the container, resulting in a volume of liquid referred to herein as "wash diluent". The wash diluent is added to the mixing volume. In the embodiment of the invention shown in FIG. 2, the diluent source 44 has two diluent outlets **50*a* and 50*b*. One of the outlets 50*a* drops diluent directly into the mixing tank 54. The other 50*b* drops diluent into a washer or pump 88 through an intake 89. The washer 88 has an exhaust line 94 that extends through the funnel 20 and opener 22 and opens into the container station 12 in the location of the interior of the container 14. The controller 58 can be operatively connected to the diluent source 44 and washer 88 so as to only operate the washer 88 when the second portion of diluent is being supplied. The controller 58 can switch the delivery of diluent between the diluent outlets or can deliver through both outlets simultaneously depending upon the requirements of a particular use. In an embodiments of the invention shown in FIGS. 3–7, and discussed in detail below, the diluent source 44 has a single outlet 50 that supplies both first and second portions of diluent. In that embodiment, the second portion of diluent is first admitted to a reservoir 62, and the washing step includes the emptying of the reservoir 62**.

Diluent continues (230) to be added until the volume of the diluted mixture (104) is in accord with the total diluent volume. In the embodiment shown in FIGS. 1A–1B, the first and second portions continue to be introduced (230) until the total diluent volume is reached; however, first and second portions could instead be added sequentially or in reverse sequence such that addition of one the portions stops while addition of the other portion is continued. The sensor 54 is used to detect (232) the volume increase which is then compared (234) by the controller to the total diluent volume. This is repeated until the total diluent volume has been reached. The diluent source is the deactuated (236) to complete the process.

During the method of the invention, although the diluent source is or can be directly coupled to the supply system, back-siphoning of diluent into the supply system is deterred. It is preferred that the first portion of diluent fall through an air gap 52, an area of free fall in which the liquid is incapable of being confined, prior to its introduction into the mixing tank 54. It is also preferred that the second portion of diluent fall through an air gap 52 prior to the use of the second portion to wash the container 14. It is more preferred both first and second portions pass through an air gap 52 after exiting the diluent source 44. It is further preferred, that the air gap 52 be located above the mixing tank 54 to protect the air gap 52 from any possible overflow of the tank 54.

Referring now to FIGS. 3–7, in other embodiments of the invention, the apparatus 10 of the invention has a station 12 for a concentrate container 14. The station 12 has a container receiver 16 and a concentrate outlet 18 communicating with the container receiver 16. Between the container receiver 16 and the concentrate outlet 18 is a funnel 20. The container receiver 16, funnel 20, and concentrate outlet 18 are tightly sealed together, or other measures are taken, to ensure that concentrate entering the container receiver 16 and funnel 20 must pass through to the concentrate outlet 18. The container receiver 16 supports the container 14 and holds the container 14 in position over the funnel 20. The station 12 includes a container opener 22.

Figure 7:
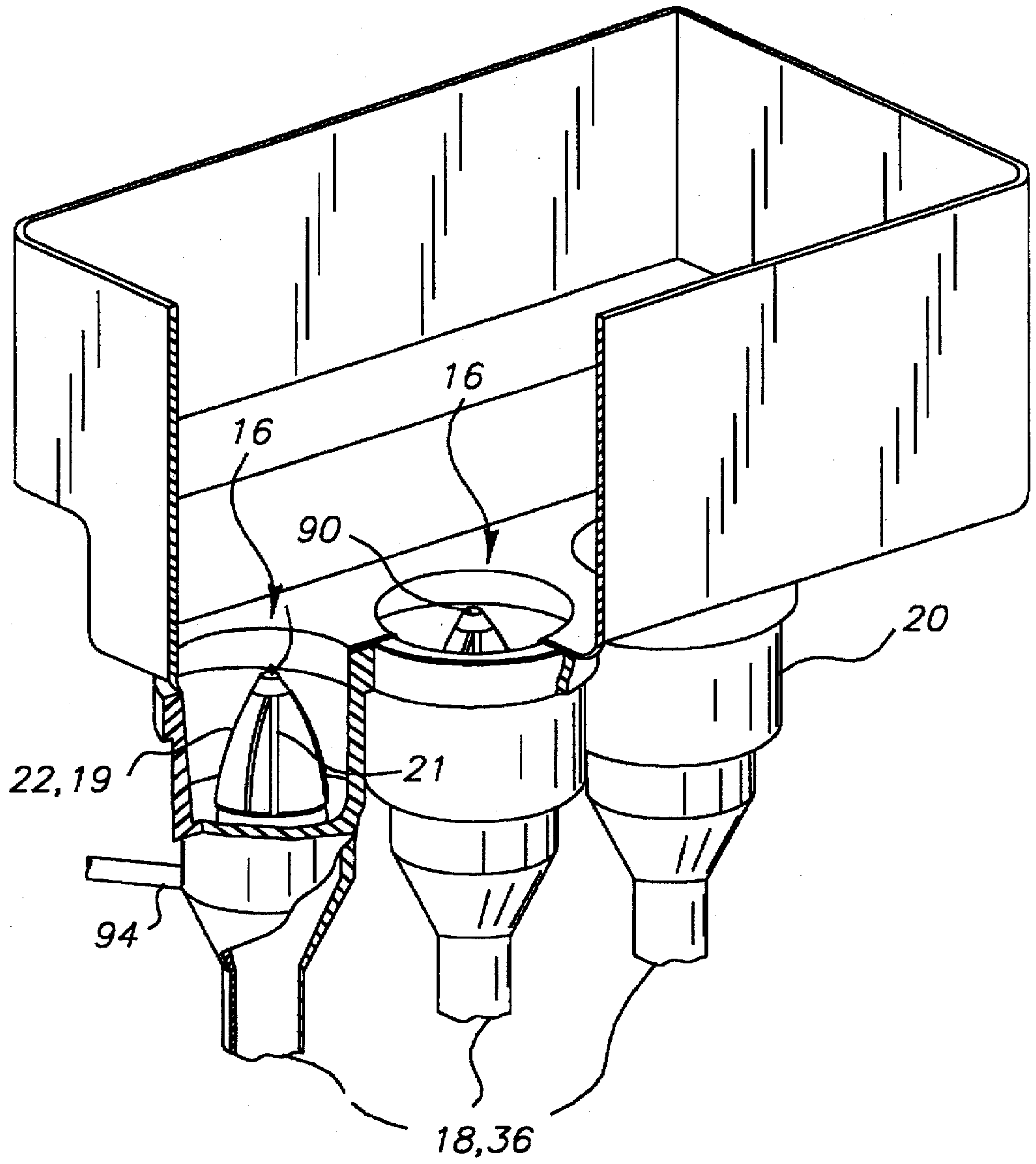
FIG. 7 is a partially cut-away perspective view of the container station of another embodiment of the apparatus of the invention.

The container receiver 16 can be complementary in shape to a particular container 14. This is useful where multiple concentrates are used that must be stored in separate containers 14. For example, concentrates could be supplied in a container having a round cross-section and a second container having a square cross-section (not shown). The station 12 would include a pair of container receivers 16 having similar cross-sections. Container receivers 16 can be united to form a single receiver unit 24, as illustrated in FIG. 7. In this embodiment of the invention, three concentrates can be provided by rectangular cross-section containers (not shown) having three different width dimensions, or if desired, by a single multiple chambered container having three separate punctureable caps.

The container receiver or receivers 16 can be configured to help prevent concentrate spillage when the container 14 is opened. An example of a suitable shape is the trough shaped container unit 24 shown in FIG. 7. Any spilled concentrate is directed into funnels 20. Another example is a covered container receiver 16 as illustrated schematically in FIGS. 3–4.

The container opener 22 can have a variety of configurations. In the embodiment of the invention illustrated in FIGS. 3–4, the container 14 is a bottle having a punctureable cap 28. (For convenience, the container, cap and the like are here referred to in the singular. The same principles, as discussed here, apply to multiple bottles or a multiple-necked bottle.) The container opener 22 is rigidly mounted within the funnel 20 and has the shape of an upwardly directed broadhead arrowhead, having vanes 19 mounted to a core 21. In this embodiment, the station 12 is actuated by driving the container 14 against the opener 22 so as to puncture the cap 28. The concentrate drains by gravity. The container 14 can be slammed against the container opener 22 manually or can be driven against the opener 22 by a piston (illustrated in FIG. 3 as element 30) or the like operated by hand or powered by a solenoid or other linear drive mechanism (not shown). The container 14 can also be held in place while the opener 22 is moved to puncture the container 14. Similarly, the opener 22 can puncture the bottom or sidewall of a container rather than the cap. The container need not include a cap and can be a flexible bag rather than a rigid bottle or the like. Appropriate mechanisms for opening and draining wide varieties of containers are well known to those skilled in the art.

The funnel 20 directs concentrate to the concentrate outlet 18. In the embodiment of the invention illustrated in FIGS. 3–4, the funnel 20 also houses the opener 22. Located below the container receiver 16 is a mixing tank 32. Between the container receiver 16 and the mixing tank 32 is a reservoir lid 34. Concentrate travels from the container 14, through the funnel 20, and into a mixing tank 32; without collecting on the reservoir lid 34. The concentrate outlet 18 can be above the reservoir lid 34 such that concentrate cascades freely through an opening in the reservoir lid 34. It is preferred, however, that the funnel 20 have a tube portion 36 such that the concentrate outlet 18 is disposed below the upper margin 38 of the mixing tank 32. The tube portion 36 can pass through an opening in the reservoir lid 34 or bypass the reservoir lid 34 as desired. The tube portion 36 can be cylindrical in cross-section and straight or can be modified as necessary to meet space constrains.

The mixing tank 32 has a volume greater than a single batch of concentrate and any necessary diluent and can have a volume great enough to hold several batches of concentrate and diluent. The top of the mixing tank 32 is open and accepts the reservoir lid 34. The mixing tank 32 includes a mixing mechanism 40, such as a stirrer or pump, that acts to blend the mixing mechanism mixing mechanism 40 is operated as needed for a particular diluted mixture or can be continuously operated or can be operated as convenient, depending upon the requirements of a particular use. The mixing tank 32 has a tank outlet 42 from which tank contents are dispensed for use.

Diluent is supplied to the mixing tank 32 from a diluent source 44 as an aloquot proportional to the concentrate added. The diluent source 44 can have a capacity limited to the diluent necessary for a single batch of diluted mixture. It is preferred, however, that the diluent source 44 have provision for multiple batches of diluted mixture. The diluent source 44 has an allocation unit 46, a connection 48 to a large diluent delivery system, and a diluent outlet 50. In preferred embodiments of the invention, the diluent is water and the diluent delivery system is a municipal water supply system or the like.

Some regulations require an anti-siphoning provision in equipment connected to public water systems. The concentrate apparatus 10 meets such requirements by supplying water through a diluent outlet 50, which is separated from other components of the apparatus 10 by a vertical air gap (indicated by arrow 52 in FIG. 2), through which the water falls by gravity.

Aloquots of diluent delivered by the diluent source 44 can have a uniform volume matching the standardized volume of a single batch of concentrate or can be variable, either automatically or by semi-automatically or manually, to match variable volumes of concentrate. The volume of added concentrate is detected by a sensor 54, which is connected to a controller 58 by a signal path 56 to a controller 58, that, in turn, sends a signal via a signal path 60 to the diluent source 44 to provide the appropriate aloquot of diluent. The sensor can take a variety of forms, such as, a float attached to a switch or a column of photocells. In a particular embodiment of the invention, the sensor is an ultrasonic detector, which is mounted above the diluted mixture and senses the distance from the diluted mixture to the detector. An example of a suitable ultrasonic detector is marketed by Honeywell Inc., as Model No. 945-F4Y-2D-1C0-180E. In this embodiment the controller has a microprocessor with a memory unit that includes a look-up table to relate the distance measured by the ultrasonic detector to the volume of the mixing tank.

The diluent source 44 can also take a variety of forms, such as, a holding tank and "flush" mechanism (actuable siphon), a tank and a pump, or a valve operated by a solenoid. The controller 58 can be a simple dedicated electronic circuit of discrete circuit elements or can be a function of a digital logic circuit that can report or monitor temperature, diluted mixture usage and the like. A mechanical or hydraulic controller could also be used.

The reservoir lid 34 receives the diluent delivered by the diluent outlet 50 in a reservoir 62 that has a volume that is less than the volume of the aloquot of water or other diluent. The reservoir 62 has an overflow reservoir outlet 64 that drains excess diluent into the mixing tank 32 as the diluent is received. The capacity of the overflow reservoir outlet 64, desirably, exceeds the rate of flow of the diluent source 44, so that excess diluent does not overflow the top of the reservoir lid 34. The reservoir lid 34 includes a through-passage or opening 66, through which the concentrate enters the mixing tank 32, bypassing the reservoir 62.

The reservoir lid 34 has a shell 68 having a downwardly directed peripheral margin 70 that engages the upper margin of the mixing tank 32. The through-passage 66 is central and the reservoir 62 has a U-shape that curves around the through-passage 66. The reservoir 62 is disposed in the underside of the shell 68 between the peripheral margin 70 and the through-passage 66. The reservoir 62 has an upwardly directed inlet 72, that preferably includes a strainer-diffuser 74 to help reduce splashing. The overflow reservoir outlet 64 is laterally directed and, in the embodiment shown in the figures, faces the through-passage 66. The reservoir 62 has a downwardly directed weep hole 76. The weep hole 76 has a rate of flow substantially less than the rate of flow of the diluent outlet 50. The floor 82 of the reservoir 64 is sloped toward the weep hole 76. Except for the inlet 72, the overflow reservoir outlet 64, the weep hole 76, and a pump intake hole 77; the reservoir 62 is fully enclosed by the top 80 of the shell 68, a floor 82, a laterally disposed peripheral wall 84, and a spillway wall 86 adjoining the overflow reservoir outlet 64. The shell 68 of the reservoir lid 34 can include cutouts 87 as necessary to meet the size constraints imposed by other components of the apparatus 10.

A pump 88 has an intake 78 that extends, through hole 77, into the reservoir 64 and an exhaust 90 directed into the container receiver 16. Passages 92,94 connect the intake 78, the pump 88, and the opener 22. The exhaust 90 consists of ports in a hollow opener 22 which, in effect, acts as a spray head for the pump 88. The pump 88 can be operated continuously (if self priming) or can be actuated by the controller 58 via a signal path 96 to operate at the same time diluent is supplied (or operate slightly thereafter). The pump 88, in that embodiment of the invention, can have a rate of flow less than the rate of flow of the diluent outlet 50 so that the pump 88 will not run dry.

Figure 3:
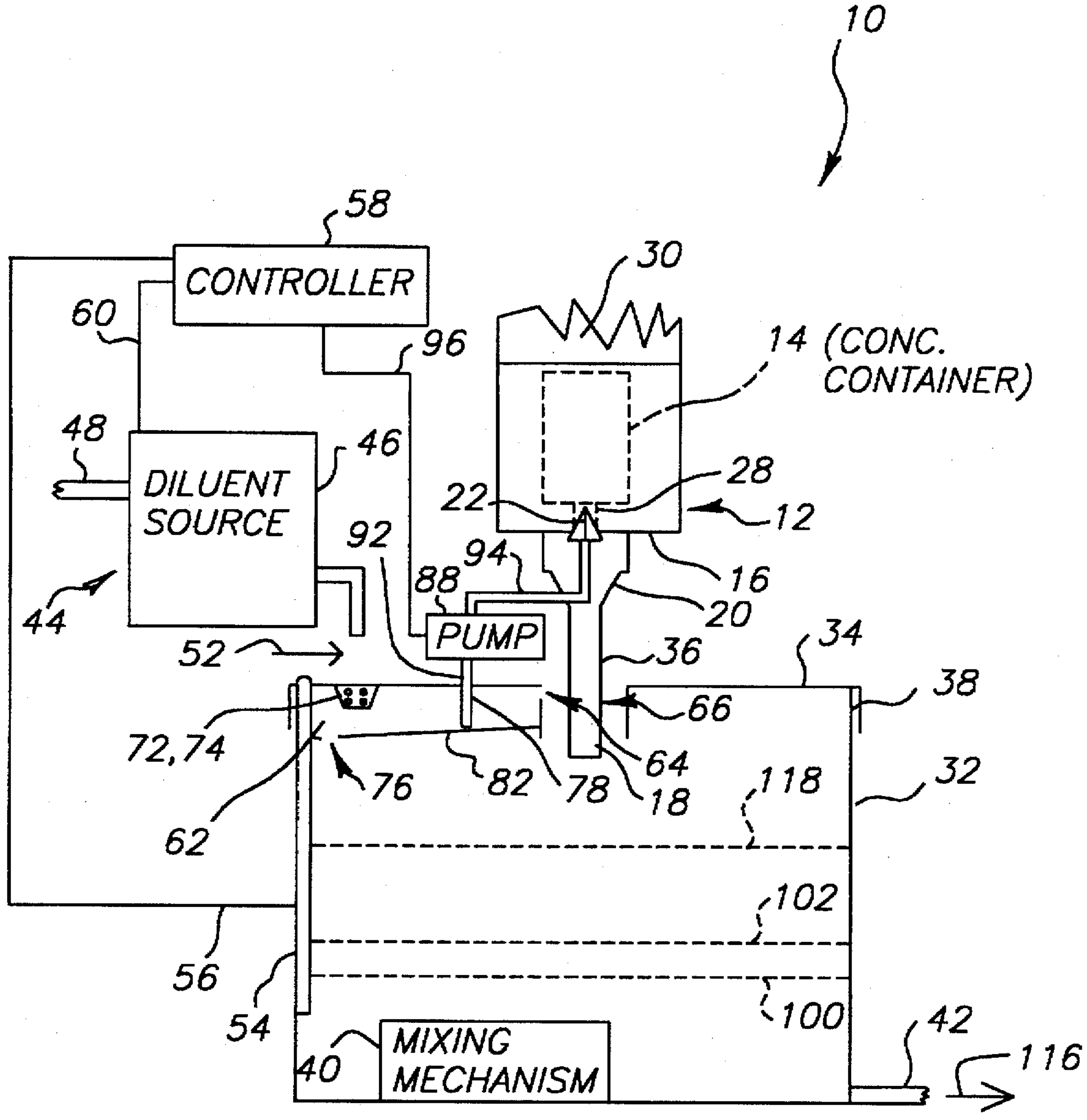
FIG. 3 is a semi-diagrammatical view of another embodiment of the apparatus of the invention.
Figure 4:
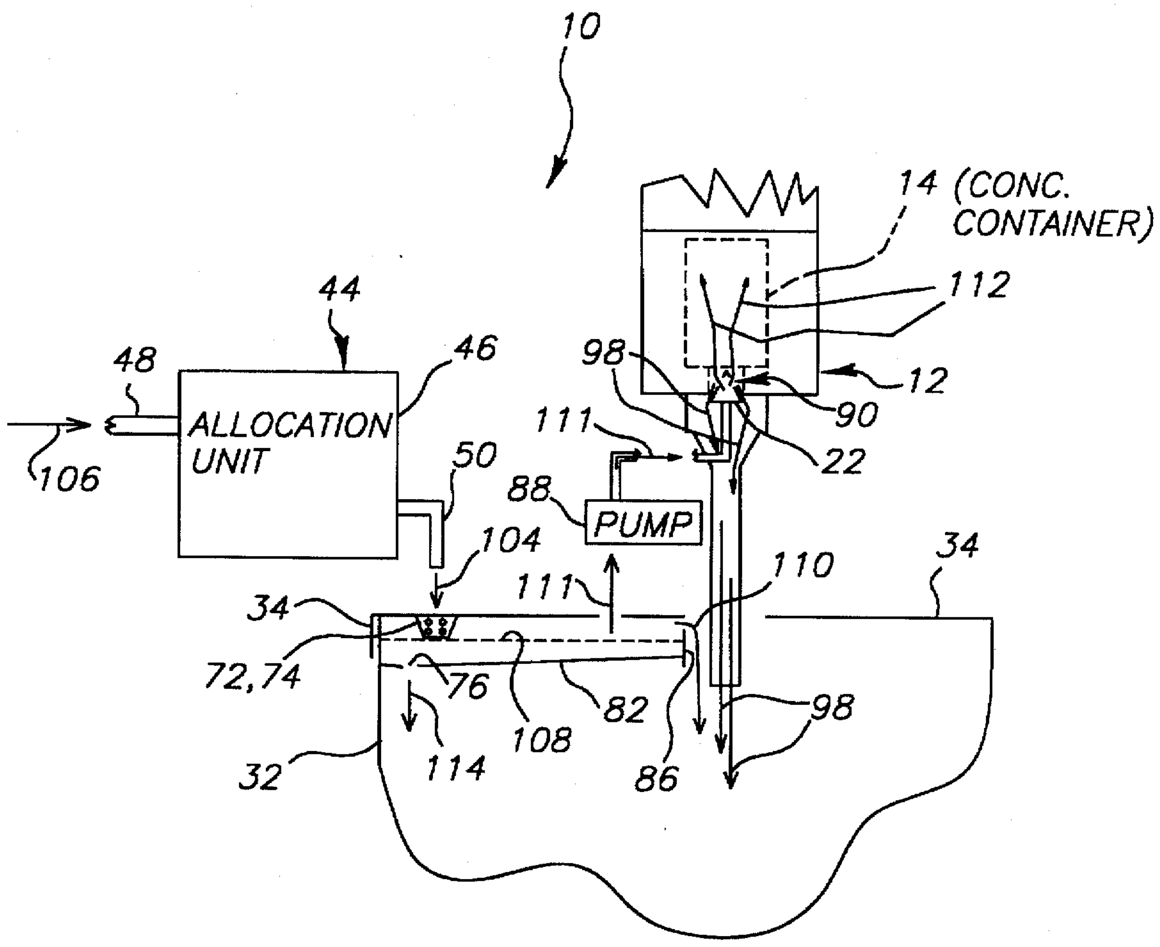
FIG. 4 is an enlarged partial semi-diagrammatical view of the apparatus of FIG. 3, in which material flows are shown by arrows.
Figure 5:
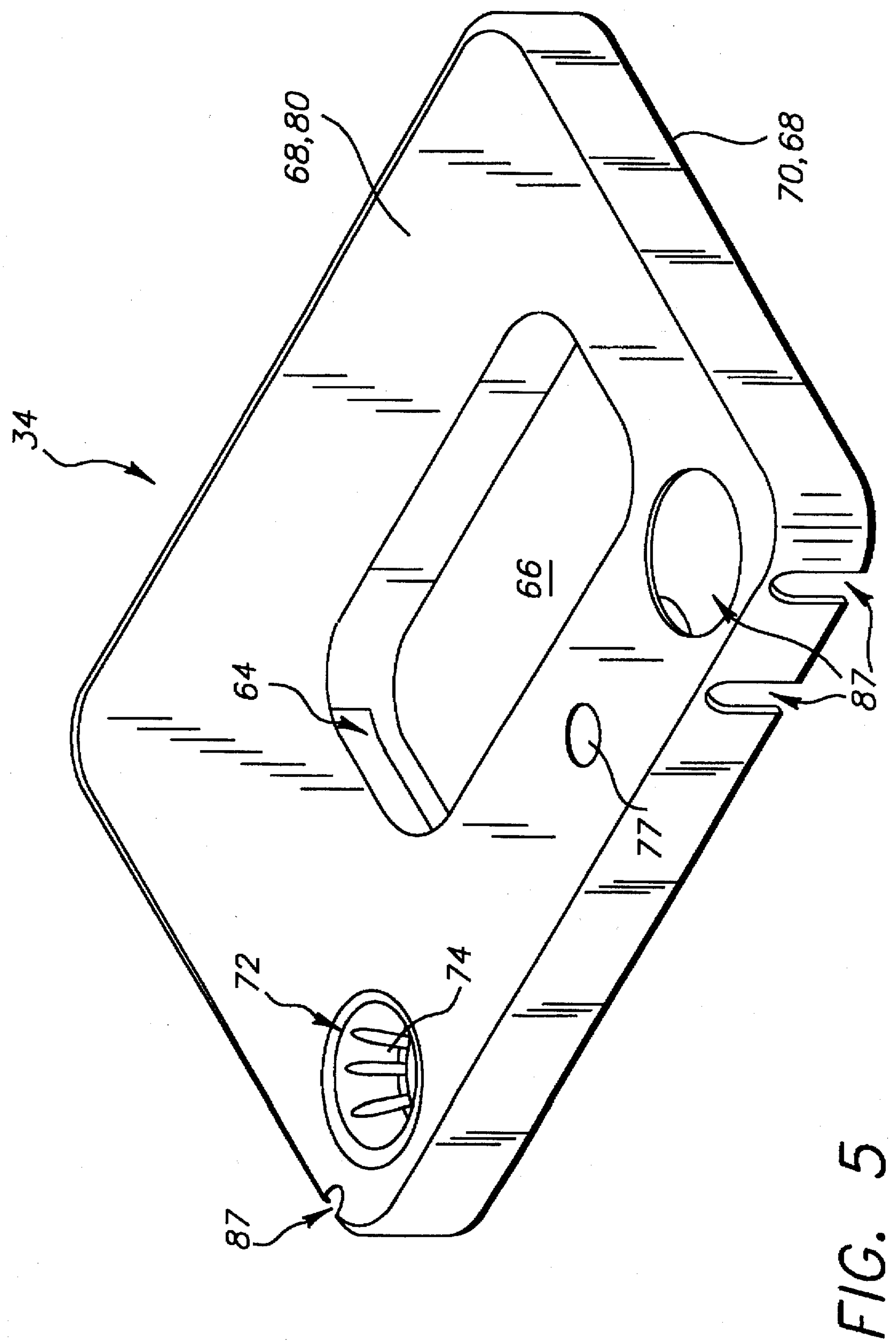
FIG. 5 is a perspective view of the reservoir lid of the apparatus of FIG. 3.
Figure 6:
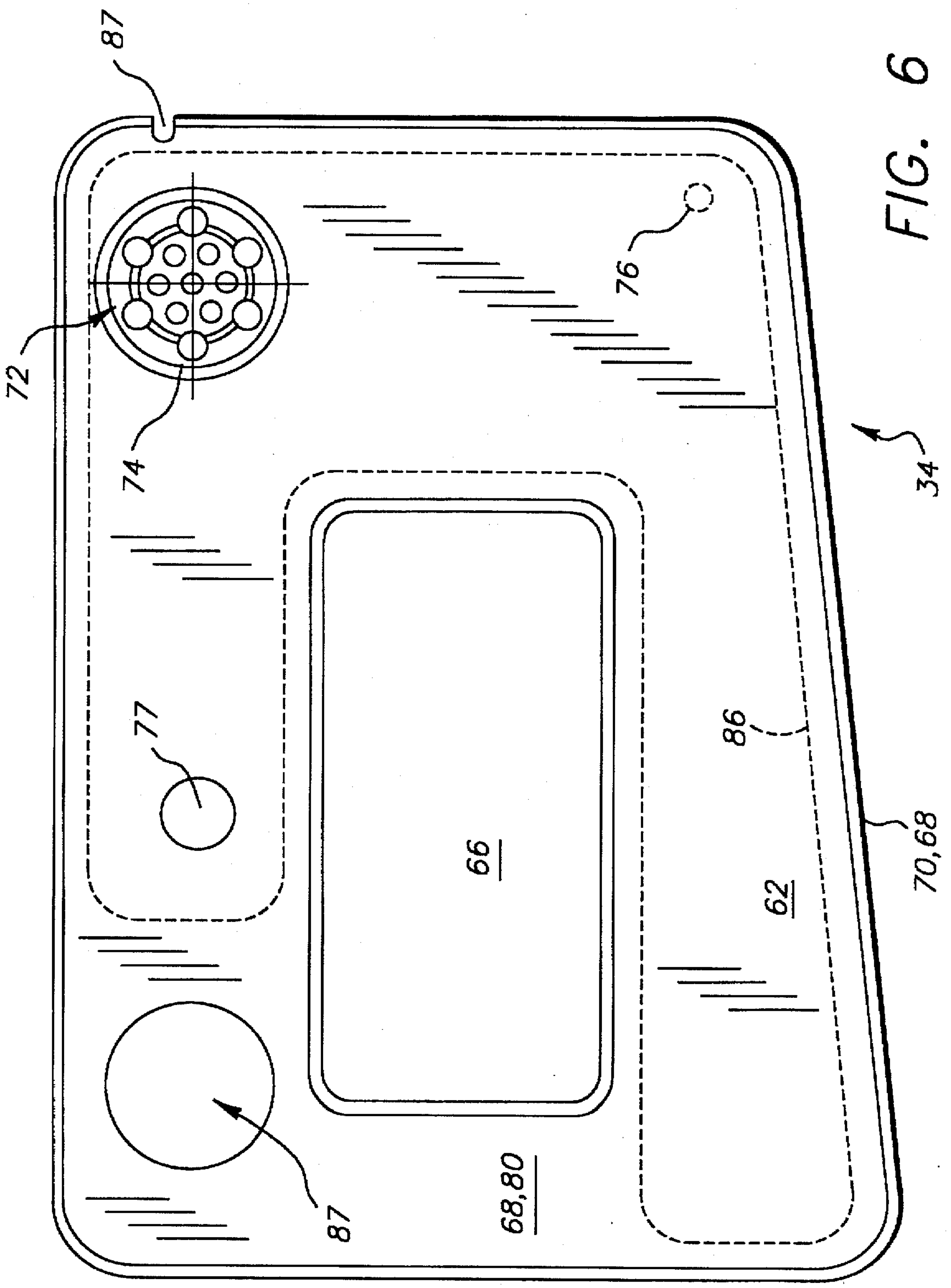
FIG. 6 is a top plan view of the reservoir lid of FIG. 5. The reservoir is indicated by dashed lines.

Referring now primarily to FIGS. 3 and 4, a batch of concentrate is added to the container receiver 16 and the station 12 is actuated. The container 14 is opened and drains (arrows 98) into the mixing tank 32 through the central opening 66 in the reservoir lid 34. The original volume of diluted mixture in the mixing tank, indicated by dashed line 100, is increased to a new level, indicated by dashed line 102, tripping the sensor 54. The diluent source 44 is actuated and delivers an aloquot of diluent (arrow 104) proportional to the concentrate added to the mixing tank 32. Replacement diluent (arrow 106) is drawn from the supply system as needed. The diluent (arrow 104) is delivered by the diluent source 44 into the reservoir lid 34 and first fills the reservoir lid 34 to the depth (indicated by dashed line 108 in FIG. 2) determined by the vertical height of the spillway wall 86. Excess diluent (arrow 110) then drains over the spillway wall 86 until delivery of the diluent is completed. The pump 88 draws diluent (arrows 111) from the reservoir 62 and sprays the diluent into the emptied container 14 (arrows 112). The diluent that was sprayed (arrows 98), including any washed down residual concentrate, drains through the central opening into the mixing tank 32. Residual diluent not drawn from the reservoir by the pump drains through the weep hole into the mixing tank 32 (arrow 114) and the reservoir is thus emptied. Concentrate and diluent entering the mixing tank 32 is mixed and the depth of the mixture in the mixing tank reaches a new level, indicated by dashed line 118. The diluted mixture is drawn down as needed (arrow 116 in FIG. 3).

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto.

Parts List mixer 10
station 12
container 14
container receiver 16
concentrate outlet 18
vanes 19 of opener
funnel 20
core 21 of opener
container opener 22
receiver unit 24
Weep holes in receiver unit 26
cap of bottle 28
piston 30
mixing tank 32
reservoir lid 34
tube portion 36
upper margin of the mixing tank 38
mixing mechanism 40
tank outlet 42
diluent source 44
allocation unit 46
connection 48 to a large diluent delivery system
diluent outlets 50, **50*a*, 50*b***
air gap 52
sensor 54
signal signal
controller 58
signal path 60
reservoir 62
overflow reservoir outlet 64
through-passage 66
shell 68
peripheral margin 70 of reservoir lid
inlet 72
strainer 74
weep hole 76 of reservoir lid
pump intake 78
top 80 of shell
floor 82 of reservoir
peripheral wall 84 or reservoir
spillway wall 86
pump 88
pump intake 89
exhaust 90
passages 92,94
signal path 96
arrows identifying flow of materials: 98,100,102,104,108, 110,112,114,116
depth of reservoir 106
placing step (200)
opening step (202)
draining step (204)
detecting step (206)
recording step (208)
obtaining step (210)
comparing step (212)
error signal step (214)
determining step (216)
starting introduction step (218)
detecting step (220)
comparing step (222)
error signal step (224)
continuing introduction step (226)
start introducing step (228)
continuing introducing step 230
detecting step (232)
comparing step 234
deactuating step 236

What is claimed is:

1. A method for mixing a containerized concentrate with diluent from a supply system, said method comprising the steps of:

placing the containerized concentrate within a container station;

opening the containerized concentrate;

draining a flowable portion of concentrate from the container into a mixing volume;

introducing into said mixing volume a first portion of said diluent;

washing a residual portion of said concentrate from the container with a second portion of said diluent to produce a volume of wash diluent, said first and second portions of diluent having a total volume proportional to the total volume of said concentrate, said draining being at least substantially completed prior to said washing; and adding said wash diluent to said mixing volume; and detecting the amount of concentrate drained into said mixing volume and adjusting the total volume of said first and second portions of diluent proportional to the amount of concentrate detected.

2. The method of claim 1 further comprising continuously deterring back-siphoning of said first and second portions of diluent into said supply system.

3. The method of claim 1 further comprising separating said first portion of diluent from said supply system by an air gap prior to said introducing.

4. The method of claim 3 further comprising separating said second portion of diluent from said supply system by an air gap prior to said washing.

5. The method of claim 1 further comprising separating said second portion of diluent from said supply system by an air gap prior to said washing.

6. The method of claim 1 further comprising retaining said container within said container station continuously during said opening, draining, and washing steps.

7. The method of claim 1 further comprising prior to said washing, admitting said second portion of diluent to a reservoir for permitting said second portion of diluent to pass from the reservoir to the container.

8. The method of claim 7 wherein said washing further comprises emptying said reservoir.

9. An apparatus for mixing a container of concentrate with diluent from a supply system, said apparatus comprising:

a mixing tank;

a container station retaining said concentrate container, said container station having a concentrate outlet delivering said concentrate to said mixing tank;

an opener disposed to open said container within said container station;

a diluent source receiving diluent from said diluent supply system and delivering an aloquot of diluent to said mixing tank, said diluent source being directly coupled to said supply system, said diluent source being separated from said mixing tank by an air gap;

a washer receiving diluent from said diluent source, said washer delivering diluent to said container station through said concentrate outlet to rinse said container; and a controller actuating said washer at least substantially after said delivering of said concentrate to said mixing tank; and a detector operatively positioned relative to said mixing tank, said detector providing a signal to said controller in response to said delivering of said concentrate, said signal being responsive to the volume of said concentrate, and wherein said controller in response to said signal actuates said diluent source to deliver said aloquot in a volume proportional to the volume of said concentrate.

10. The apparatus of claim 9 wherein said washer is separated from said diluent source by an air gap.

11. The apparatus of claim 9 wherein said opener is disposed in a fixed position within said container station to pierce said container.

12. The apparatus of claim 9 wherein said detector and said controller together further comprise means for detecting nondelivery of said concentrate or said diluent.

* * * * *